United States Patent
Horng (10) Patent No.: US 10,797,557 B2
(45) Date of Patent: Oct. 6, 2020

(54) MOTOR

(71) Applicant: Sunonwealth Electric Machine Industry Co., Ltd., Kaohsiung (TW)

(72) Inventor: Alex Horng, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 183 days.

(21) Appl. No.: 16/151,403

(22) Filed: Oct. 4, 2018

(65) Prior Publication Data

US 2019/0348888 A1   Nov. 14, 2019

(30) Foreign Application Priority Data

May 11, 2018   (TW) .............................. 107116179 A (51) Int. Cl.
| | |
|---|---|
| *H02K 5/16* | (2006.01) |
| *H02K 7/08* | (2006.01) |
| *F16C 27/06* | (2006.01) |
| *H02K 15/14* | (2006.01) |
| *F16C 3/02* | (2006.01) |

(52) U.S. Cl.
CPC ............... *H02K 5/16* (2013.01); *F16C 27/06* (2013.01); *H02K 7/085* (2013.01); *F16C 3/02* (2013.01); *F16C 2208/14* (2013.01); *H02K 15/14* (2013.01)

(58) Field of Classification Search
CPC .......... H02K 5/16; H02K 7/085; H02K 15/14; F16C 27/06; F16C 3/02; F16C 2208/14
See application file for complete search history.

(56) References Cited

U.S. PATENT DOCUMENTS

| | | | | |
|---|---|---|---|---|
| 6,024,496 | A * | 2/2000 | Shy | F04D 29/063 384/279 |
| 6,278,248 | B1 * | 8/2001 | Hong | H02K 29/08 318/400.3 |
| 7,342,336 | B1 * | 3/2008 | Horng | H02K 7/085 310/90 |
| 7,649,291 | B2 * | 1/2010 | Horng | H02K 5/1675 310/90 |
| 8,207,643 | B2 * | 6/2012 | Horng | H02K 5/1675 310/67 R |
| 8,257,064 | B2 | 9/2012 | Oota et al. | |

(Continued)

FOREIGN PATENT DOCUMENTS

| | | |
|---|---|---|
| CN | 101997352 A | 3/2011 |
| TW | 201815026 A | 4/2018 |

*Primary Examiner* — Mohamad A Musleh
(74) *Attorney, Agent, or Firm* — Alan D. Kamrath; Mayer & Williams PC (57) ABSTRACT

A motor includes a seat, a bearing, a limiting member, a stator and a rotor. The seat includes a base plate and a shaft tube connected to the base plate. The shaft tube includes an open end distant to the base plate and having a plurality of fusion posts. The bearing is received in the shaft tube. The limiting member has a central hole. A diameter of the central hole is smaller than a diameter of the open end. The limiting member has a plurality of through-holes surrounding the central hole. The plurality of fusion posts respectively extends through the plurality of through-holes to fix the limiting member to the shaft tube by fusion bonding. The stator is fit around the shaft tube. The rotor includes a shaft extending through the central hole of the limiting member and rotatably coupled with the bearing.

9 Claims, 8 Drawing Sheets

(56) References Cited

U.S. PATENT DOCUMENTS

| | | | |
|---|---|---|---|
| 8,550,720 B2 | 10/2013 | Horng et al. | |
| 2004/0228559 A1* | 11/2004 | Horng | F16C 25/08 |
| | | | 384/517 |
| 2009/0256441 A1* | 10/2009 | Horng | H02K 7/085 |
| | | | 310/90 |
| 2012/0192409 A1* | 8/2012 | Horng | H02K 7/085 |
| | | | 29/732 |
| 2012/0194010 A1* | 8/2012 | Horng | H02K 15/14 |
| | | | 310/43 |

* cited by examiner

MOTOR

CROSS REFERENCE TO RELATED APPLICATION

The application claims the benefit of Taiwan application serial No. 107116179, filed on May 11, 2018, and the entire contents of which are incorporated herein by reference.

BACKGROUND OF THE INVENTION

1. Field of the Invention

The present invention generally relates to a motor and, more particularly, to a motor which can prevent disengagement of the bearing.

2. Description of the Related Art

Figure 1:
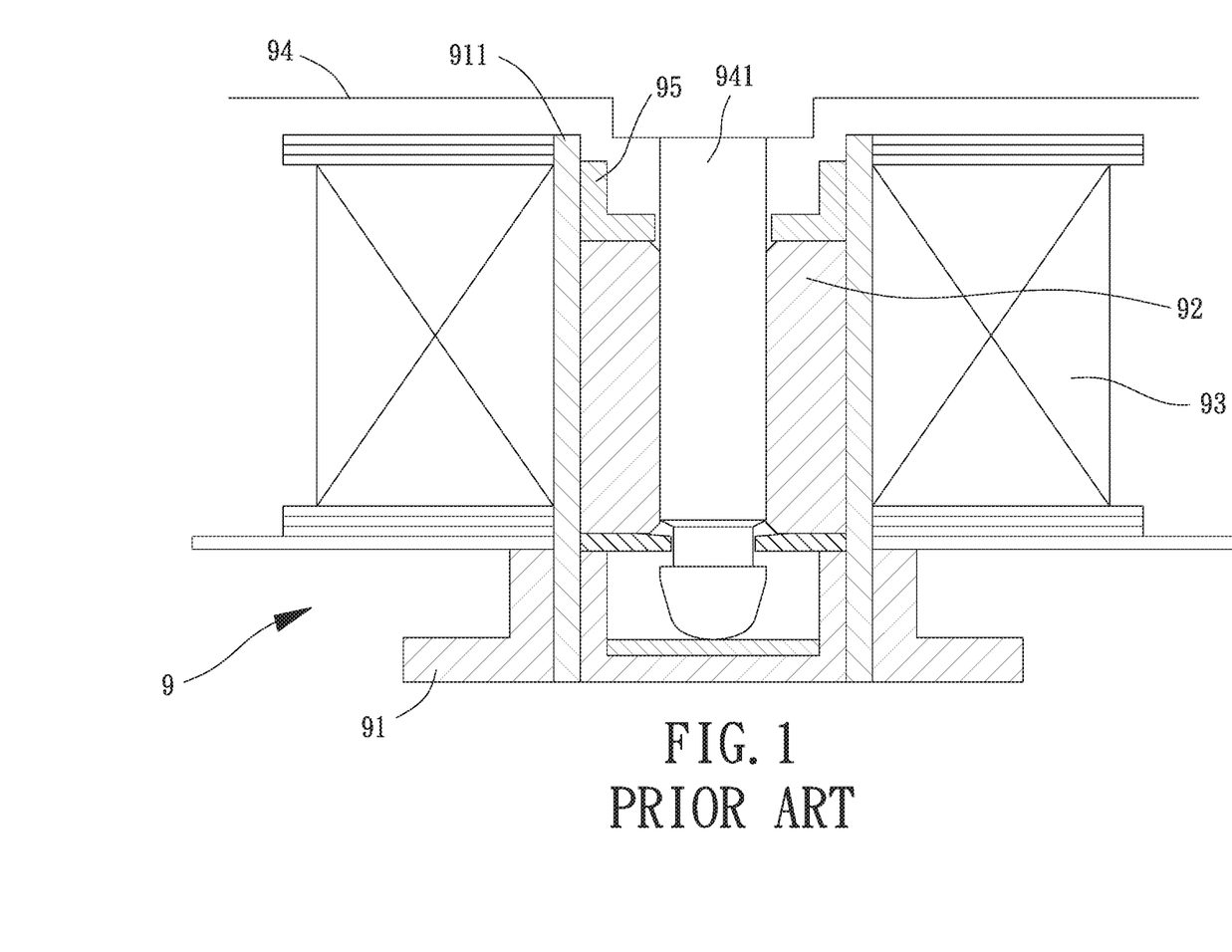
FIG. 1 is a cross sectional view of a conventional motor.

FIG. 1 shows a conventional motor 9 including a base 91, a bearing 92, a stator 93, a rotor 94 and a positioning member 95. The base 91 includes a shaft tube 911. The bearing 92 is received in the shaft tube 911. The stator 93 is coupled with an outer periphery of the shaft tube 911. The rotor 94 includes a shaft 941 rotatably coupled with the bearing 92. The positioning member 95 is received in the shaft tube 911 and abuts a top of the bearing 92. In this arrangement, the positioning member 95 can prevent the displacement of the bearing 92 relative to the shaft tube 911.

However, the assembly of the positioning member 95 and the shaft tube 911 is not convenient. Thus, a special fixture is required to press fit the positioning member 95 with the shaft tube 911, making it time-consuming and troublesome to assemble the positioning member 95 and the shaft tube 911. The assembly efficiency is low. Furthermore, due to the factors such as the thermal expansion and contraction and the operational stress, the positioning member 95 will no longer be properly press fit with the shaft tube 911 after a long time of use. As a result, the positioning member 95 cannot stably press the bearing 92 such that the bearing 92 tends to displace and disengage from the shaft tube 911. The performance and service life of the motor 9 are affected.

In light of this, it is necessary to improve the conventional motor.

SUMMARY OF THE INVENTION

It is therefore the objective of this invention to provide a motor which includes a limiting member coupled with the shaft tube by fusion bonding. Thus, the limiting member can be securely coupled with the shaft tube to prevent the bearing from disengaging from the shaft tube due to the displacement of the bearing.

In an aspect, a motor including a seat, a bearing, a limiting member, a stator and a rotor is disclosed. The seat includes a base plate and a shaft tube connected to the base plate. The shaft tube includes an open end distant to the base plate and having a plurality of fusion posts. The bearing is received in the shaft tube. The limiting member has a central hole. A diameter of the central hole is smaller than an inner diameter of the open end. The limiting member has a plurality of through-holes surrounding the central hole. The plurality of fusion posts respectively extends through the plurality of through-holes to fix the limiting member to the shaft tube by fusion bonding. The stator is fit around the shaft tube. The rotor includes a shaft extending through the central hole of the limiting member and rotatably coupled with the bearing.

Thus, the motor according to the invention permits the limiting member to be coupled with the shaft tube by fusion bonding by extending the plurality of fusion posts of the shaft tube respectively through the plurality of through-holes of the limiting member, securely fixing the limiting member to the shaft tube. In this arrangement, the convenience in assembly of the limiting member and the shaft tube is improved and the coupling strength therebetween is enhanced, effectively avoiding the disengagement of the bearing from the shaft tube caused by the loosening or displacement of the bearing. As a result, the lifespan of the motor is increased and the performance of the motor is improved.

In an example, the limiting member has an outer diameter larger than an outer diameter of the open end of the shaft tube, and the limiting member is axially aligned with the stator. Thus, the disengagement of the stator from the shaft tube is prevented.

In the example, the motor further includes a buffering member sandwiched between the shaft tube and the stator. Thus, the limiting member is axially aligned with the buffering member and the stator.

In the example, the buffering member is located relatively adjacent to the open end and relatively distant to the base plate. Thus, the limiting member is able to abut the buffering member.

In the example, the buffering member is made of flexible material including rubber or silicone. Thus, the buffering member is able to provide a vibration reduction effect.

In the example, the shaft includes a narrow portion. The limiting member includes at least one engagement portion protruding inwards from an inner periphery of the limiting member delimiting the central hole. The at least one engagement portion extends into the narrow portion when the limiting member is coupled with the shaft. Thus, the limiting member can limit the axial displacement of the shaft during the rotation of the shaft, avoiding the disengagement of the shaft from the bearing.

In the example, the at least one engagement portion includes four engagement portions, and an indent is formed between two adjacent ones of the four engagement portions. Thus, the engagement of the limiting member and the shaft is facilitated under the arrangement of the indents.

In the example, the four engagement portions are annularly arranged to define an engagement hole, and the engagement hole has a diameter larger than a diameter of the narrow portion and smaller than a diameter of the shaft. Thus, the disengagement of the shaft from the bearing can be prevented during the rotation of the shaft.

In the example, the limiting member abuts the stator and the bearing. This prevents the loosening or axial displacement of the stator and the bearing relative to the shaft tube.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

In the various figures of the drawings, the same numerals designate the same or similar parts. Furthermore, when the terms "top", "bottom" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

Figure 3:
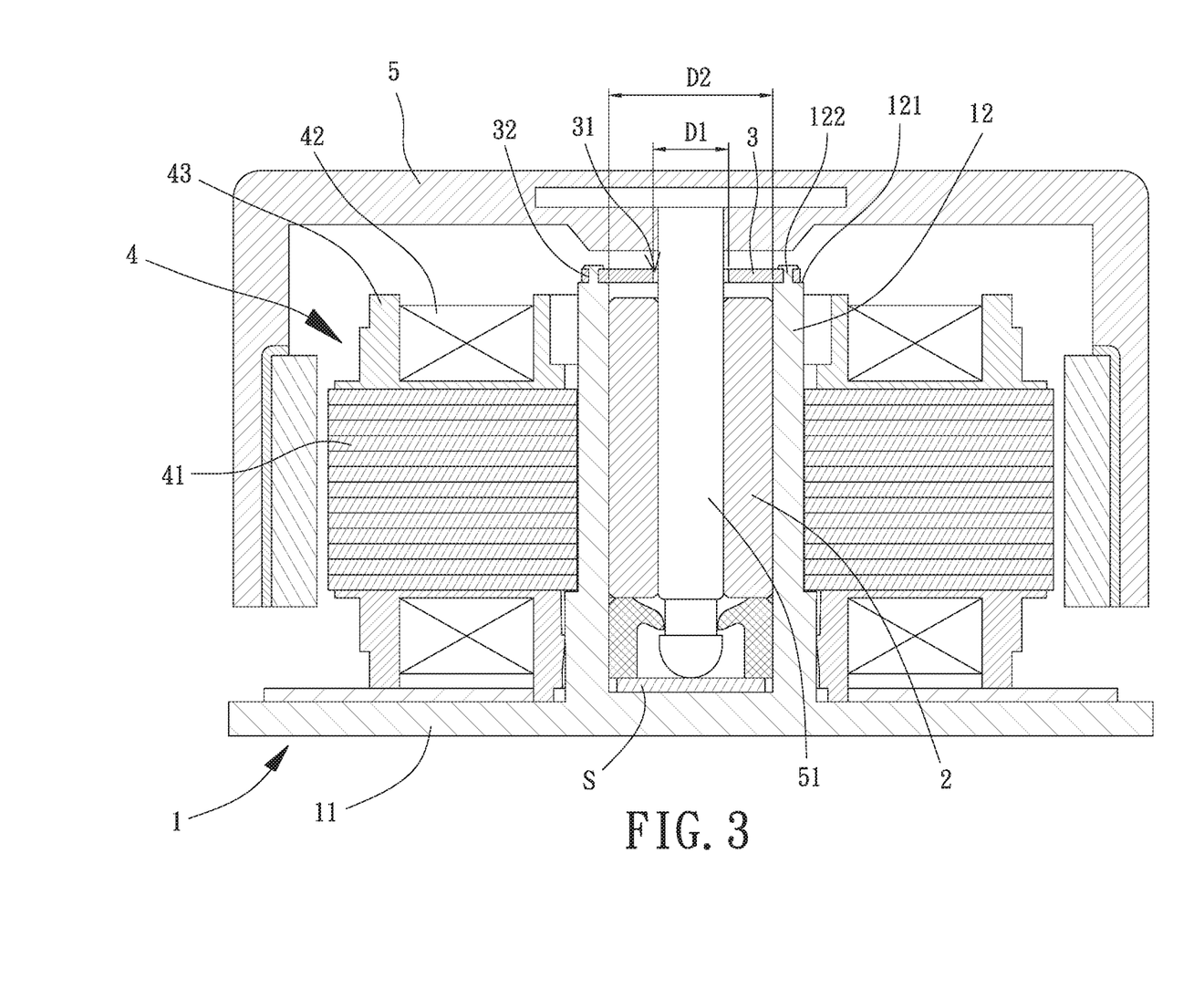
FIG. 3 is a cross sectional, assembled view of the motor according to the first embodiment of the invention.

FIG. 3 shows a motor according to a first embodiment of the invention. The motor includes a seat 1, a bearing 2, a limiting member 3, a stator 4, and a rotor 5 rotatably coupled with the bearing 2. The bearing 2, the limiting member 3 and the stator 4 are mounted to the seat 1.

Figure 2:
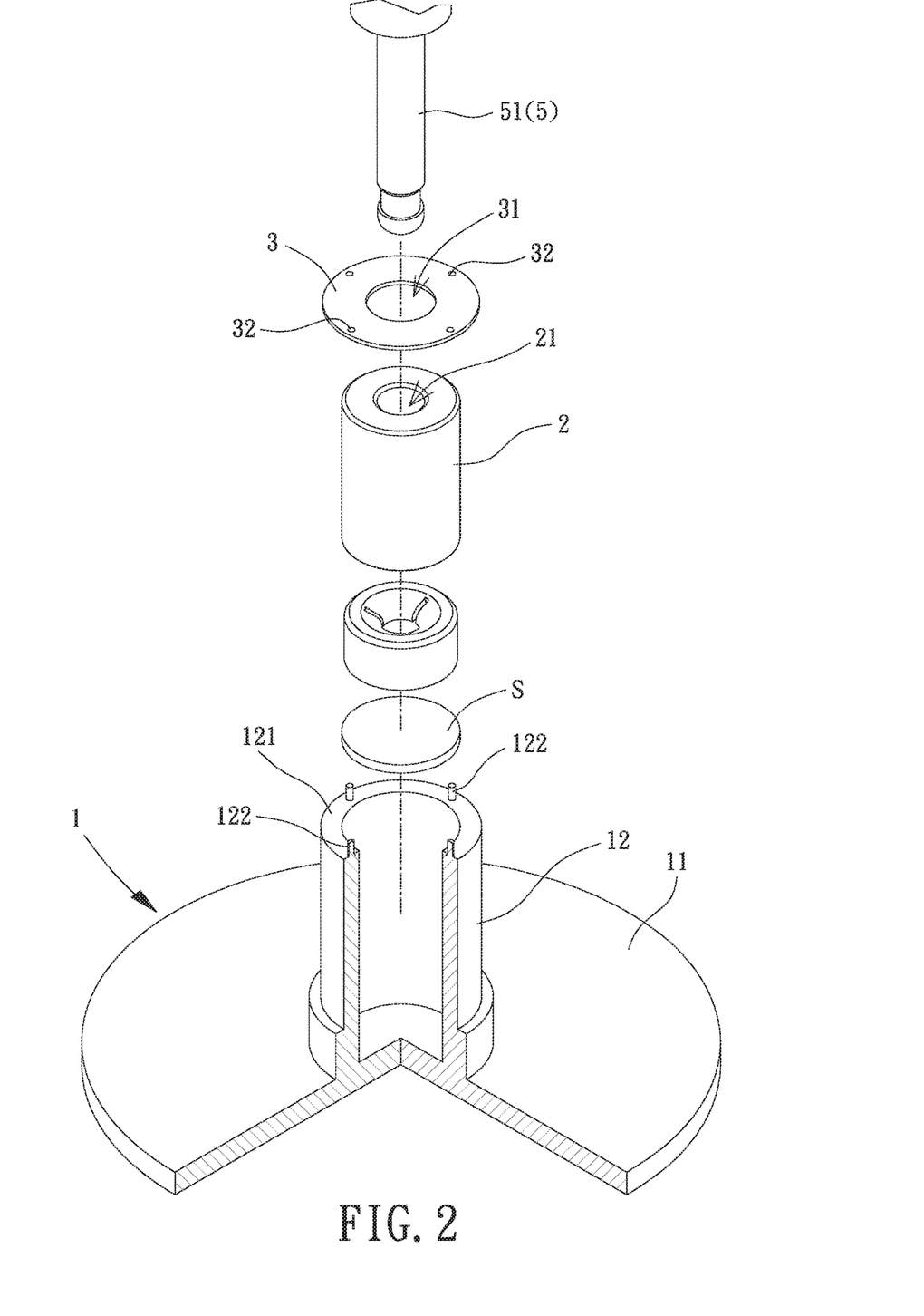
FIG. 2 is an exploded, perspective view of a motor not including a stator according to a first embodiment of the invention.

Referring to FIGS. 2 and 3, the seat 1 includes a base plate 11 and a shaft tube 12 connected to the base plate 11. The shaft tube 12 is mounted on the base plate 11. The base plate 11 and the shaft tube 12 are preferably formed in an integral manner to increase the structural strength of the seat 1. In this embodiment, the base plate 11 and the shaft tube 12 are made of plastic material and are integrally formed with each other. However, this is not used to limit the invention. The shaft tube 12 includes an open end 121 at an end of the shaft tube 12 distant to the base plate 11. A plurality of fusion posts 122 is disposed at the open end 121. Another end of the shaft tube 12 preferably forms a blind hole.

The bearing 2 is received in the shaft tube 12 of the seat 1 and includes a shaft hole 21.

The limiting member 3 includes a central hole 31 having a diameter D1 smaller than an inner diameter D2 of the open end 121, such that the limiting member 3 can be coupled with the open end 121 of the shaft tube 12. The limiting member 3 includes a plurality of through-holes 32 surrounding the central hole 31. The plurality of fusion posts 122 respectively extends through the plurality of through-holes 32 and is deformed under heat to engage with the limiting member 3 to fix the limiting member 3 to the shaft tube 12.

The stator 4 is coupled with the seat 1 and mounted around the shaft tube 12. The stator 4 can be of any structure that can drive the rotor 5 to rotate. In this embodiment, the stator 4 can be fit around the shaft tube 12 and includes a silicon steel plate unit 41 and a coil unit 42. The silicon steel plate unit 41 is mounted around and is preferably not in contact with the shaft tube 12. The coil unit 42 is wound around the silicon steel plate unit 41. The stator 4 can further include an insulation sleeve 43 disposed on the top and bottom of the silicon steel plate unit 41 and clamping the silicon steel plate unit 41. The insulation sleeve 43 is disposed between the silicon steel plate unit 41 and the coil unit 42.

The rotor 5 includes a shaft 51 extending through the central hole 31 of the limiting member 3 and rotatably received in the shaft hole 21 of the bearing 2. A wear resistant plate S can be disposed in the bottom of the shaft tube 12. The shaft 51 abuts the wear resistant plate S to prevent the shaft 51 from coming into contact with the base plate 11 and adversely abrading the base plate 11.

Referring to FIG. 3, based on the above structure, the limiting member 3 is coupled with the open end 121 of the shaft tube 12. The plurality of fusion posts 122 respectively extends through the plurality of through-holes 32 of the limiting member 3 and then is deformed under heat to engage with the limiting member 3, fixing the limiting member 3 to the shaft tube 12. Advantageously, the assembly of the limiting member 3 and the shaft tube 12 is convenient and the coupling strength therebetween is enhanced. This can prevent the disengagement of the bearing 2 from the shaft tube 12 caused by the loosening or displacement of the bearing 2, thereby increasing the lifespan of the motor and improving the performance of the motor.

Figure 4:
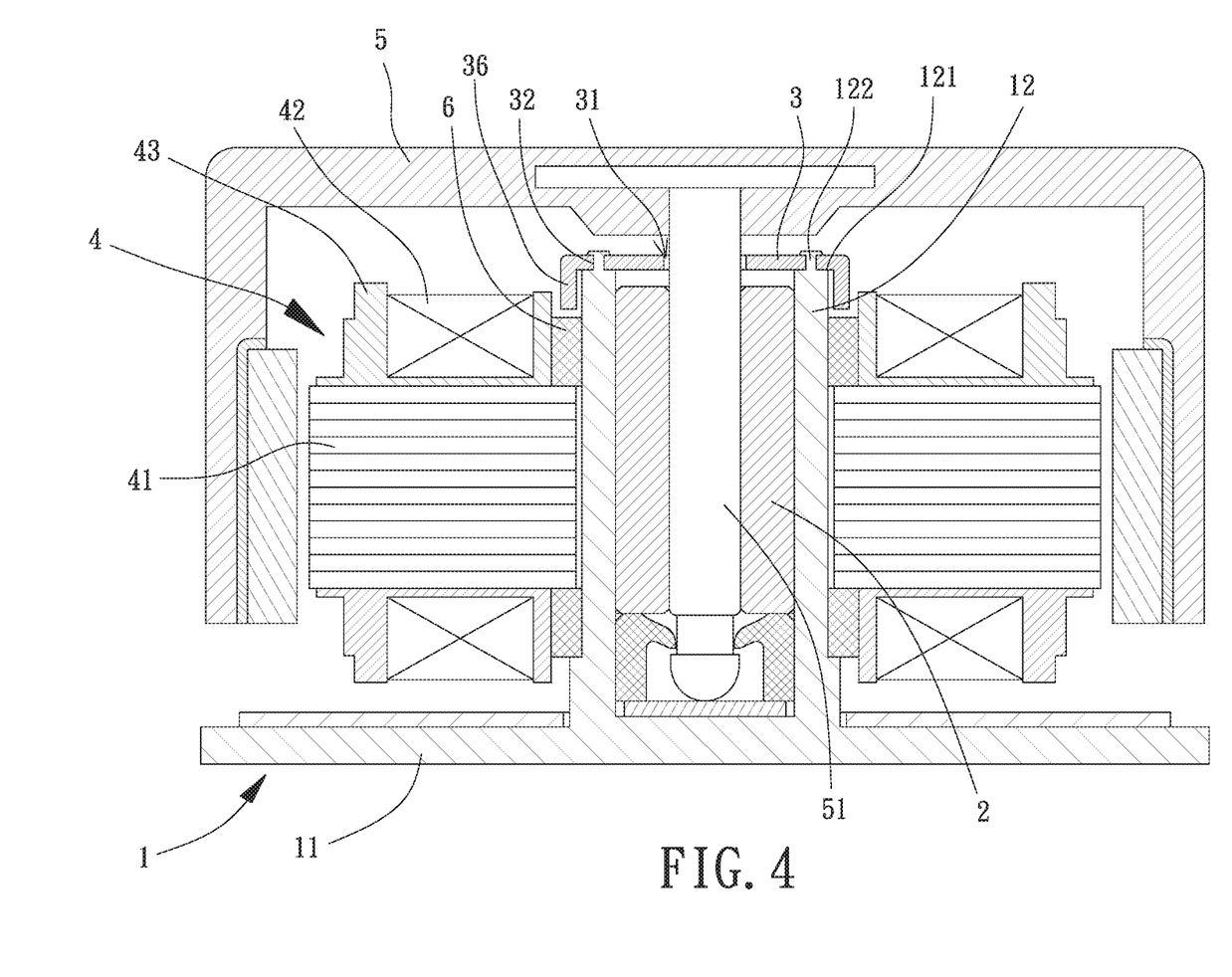
FIG. 4 is a cross sectional, assembled view of a motor according to a second embodiment of the invention.

FIG. 4 shows a motor according to a second embodiment of the motor. The second embodiment is substantially the same as the first embodiment except for that the outer diameter of the limiting member 3 in the second embodiment is larger than an outer diameter of the open end 121 of the shaft tube 12, and that the bottom face of the limiting member 3 forms a protrusion 36 that is axially aligned with the stator 4 to prevent the stator 4 from axially disengaging from the shaft tube 12.

Specifically, the motor according to the invention can further include a buffering member 6 which is preferably made of a flexible material such as rubber or silicone. The buffering member 6 is mounted to an outer periphery of the shaft tube 12 and is adjacent to the open end 121. The buffering member 6 is preferably fit around the outer periphery of the shaft tube 12 and is located between the shaft tube 12 and the insulation sleeve 43 of the stator 4, permitting the stator 4 to couple with the shaft tube 12 via the buffering member 6. In this arrangement, the buffering member 6 can provide a vibration reduction effect during the rotation of the motor, reducing the vibration energy that is transmitted to the outside of the motor. In this embodiment, the protrusion 36 of the limiting member 3 preferably extends into the space between the shaft tube 12 and the insulation sleeve 43. In this situation, the protrusion 36 of the limiting member 3 can axially align with the buffering member 6 and the silicon steel plate unit 41 of the stator 4, preventing the stator 4 and the buffering member 6 from axially disengaging from the shaft tube 12.

Figure 5:
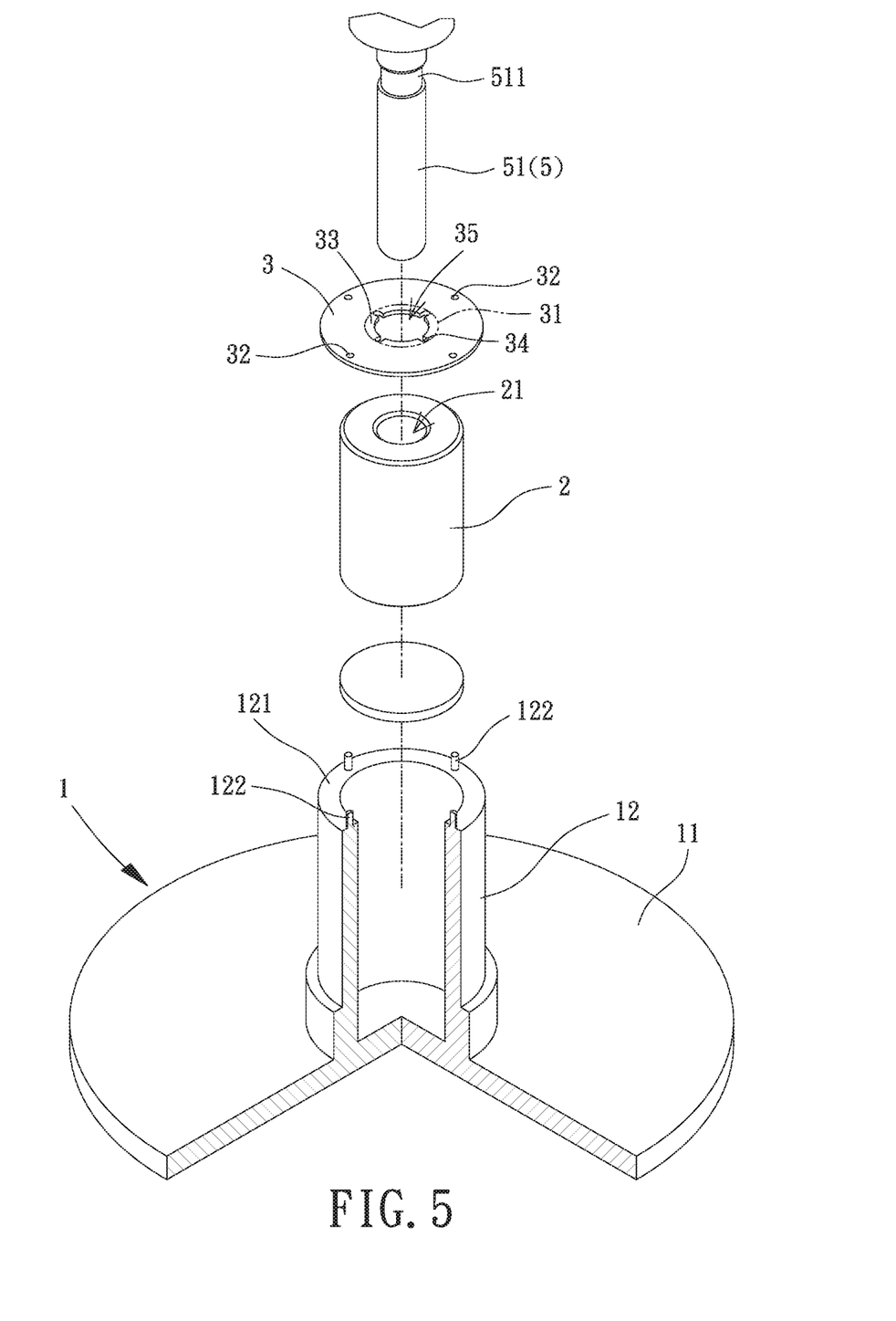
FIG. 5 is an exploded, perspective view of a motor not including a stator according to a third embodiment of the invention.
Figure 6:
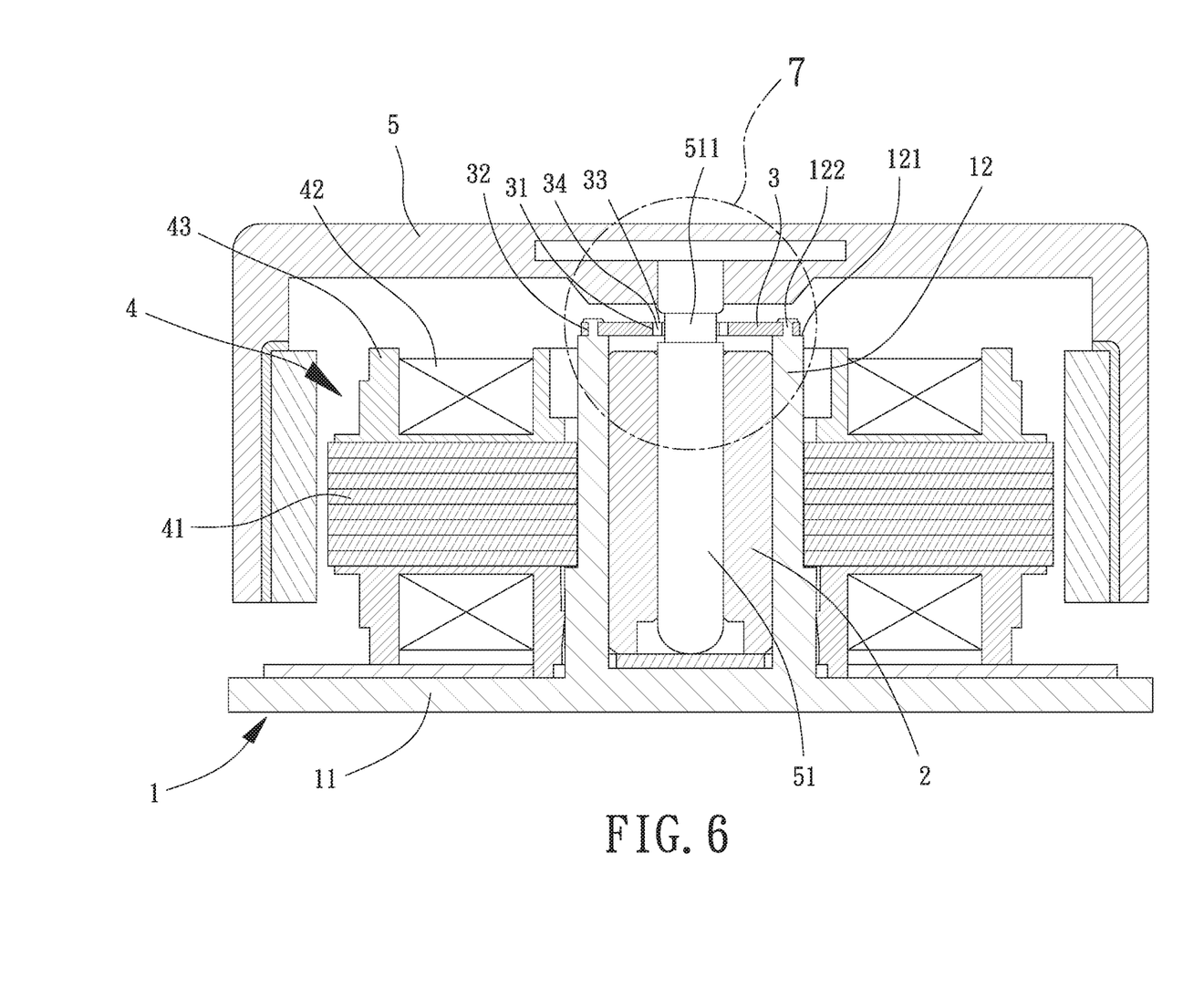
FIG. 6 is a cross sectional, assembled view of the motor according to the third embodiment of the invention.
Figure 7:
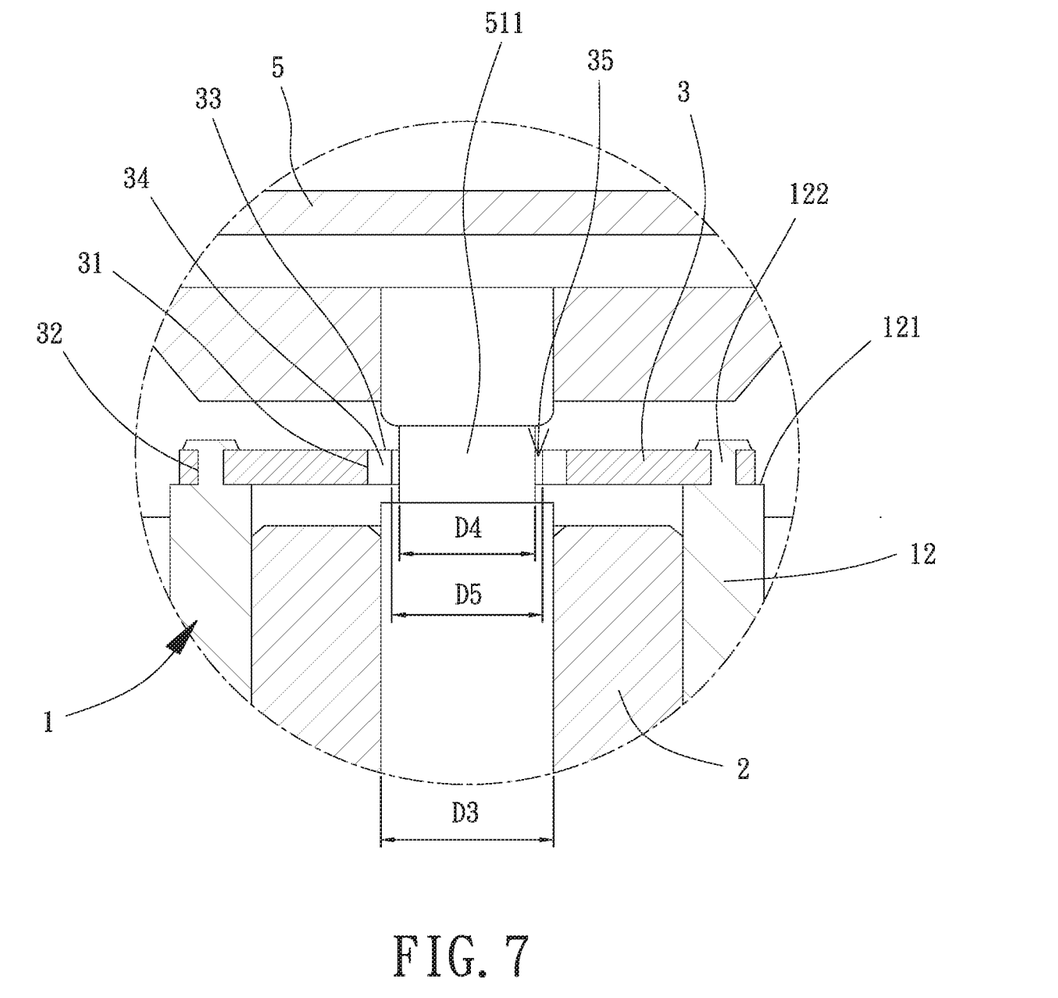
FIG. 7 is a partially-enlarged, cross sectional view of the motor according to the third embodiment of the invention.

FIGS. 5, 6 and 7 show a motor according to a third embodiment of the invention. The third embodiment is substantially the same as the first embodiment except for that the shaft 51 includes a narrow portion 511 around which the limiting member 3 is fit. Specifically, the limiting member 3 includes at least one engagement portion 33 protruding inwards from an inner periphery of the limiting member 3 delimiting the central hole 31. Therefore, when the limiting member 3 is coupled with the shaft 51, the at least one engagement portion 33 can extend into the narrow portion 511. In this arrangement, the limiting member 3 can limit the axial displacement of the shaft 51 during the rotation of the shaft 51, avoiding the disengagement of the shaft 51 from the bearing 2.

In this embodiment, there are four engagement portions 33. An indent 34 is formed between two adjacent engagement portions 33. During the assembly of the limiting member 3 and the shaft 51, the limiting member 3 can be conveniently coupled with the shaft 51 via the indent 34. Besides, the engagement portions 33 can be annularly arranged to define an engagement hole 35. The engagement hole 35 has a diameter D5 preferably larger than the diameter D4 of the narrow portion 511 and smaller than the diameter D3 of the shaft 51, such that the limiting member 3 can be fit around the shaft 51 via the engagement hole 35. Therefore, the disengagement of the shaft 51 from the bearing 2 can be prevented during the rotation of the shaft 51.

Figure 8:
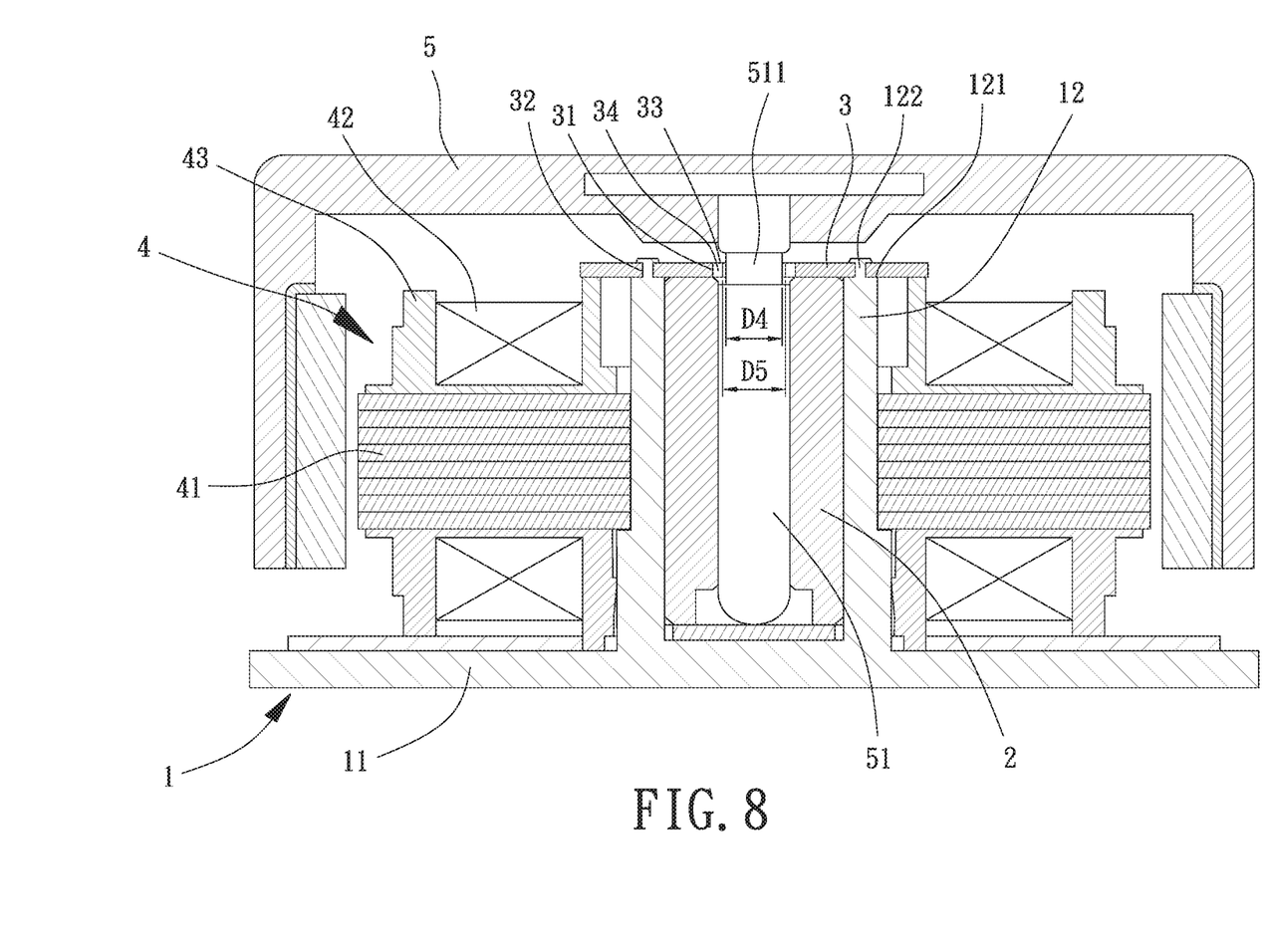
FIG. 8 is a cross sectional, assembled view of a motor according to a fourth embodiment of the invention.

FIG. 8 shows a motor according to a fourth embodiment of the invention. The fourth embodiment is substantially the same as the third embodiment except for that the limiting member 3 is axially aligned with the stator 4 and abuts the insulation sleeve 43 and the bearing 2 to prevent the loosening and axial displacement of the stator 4 and the bearing 2.

In summary, the motor according to the invention permits the limiting member to be coupled with the shaft tube by fusion bonding by extending the plurality of fusion posts of the shaft tube respectively through the plurality of through-holes of the limiting member, securely fixing the limiting member to the shaft tube. In this arrangement, the convenience in assembly of the limiting member and the shaft tube is improved and the coupling strength therebetween is enhanced, effectively avoiding the disengagement of the bearing from the shaft tube caused by the loosening or displacement of the bearing. As a result, the lifespan of the motor is increased and the performance of the motor is improved.

Although the invention has been described in detail with reference to its presently preferable embodiments, it will be understood by one of ordinary skill in the art that various modifications can be made without departing from the spirit and the scope of the invention, as set forth in the appended claims

What is claimed is:

1. A motor comprising:
   a seat including a base plate and a shaft tube connected to the base plate, wherein the shaft tube includes an open end distant to the base plate and having a plurality of fusion posts;
   a bearing received in the shaft tube;
   a limiting member having a central hole, wherein a diameter of the central hole is smaller than an inner diameter of the open end, wherein the limiting member has a plurality of through-holes surrounding the central hole, and wherein the plurality of fusion posts respectively extends through the plurality of through-holes to fix the limiting member to the shaft tube by fusion bonding;
   a stator fit around the shaft tube; and
   a rotor including a shaft extending through the central hole of the limiting member and rotatably coupled with the bearing.

2. The motor as claimed in claim 1, wherein the limiting member has an outer diameter larger than an outer diameter of the open end of the shaft tube, and wherein the limiting member is axially aligned with the stator.

3. The motor as claimed in claim 2, further comprising a buffering member sandwiched between the shaft tube and the stator.

4. The motor as claimed in claim 3, wherein the buffering member is located relatively adjacent to the open end and relatively distant to the base plate.

5. The motor as claimed in claim 3, wherein the buffering member is made of flexible material including rubber or silicone.

6. The motor as claimed in claim 1, wherein the shaft includes a narrow portion, wherein the limiting member includes at least one engagement portion protruding inwards from an inner periphery of the limiting member delimiting the central hole, and wherein the at least one engagement portion extends into the narrow portion when the limiting member is coupled with the shaft.

7. The motor as claimed in claim 6, wherein the at least one engagement portion includes four engagement portions, and wherein an indent is formed between two adjacent ones of the four engagement portions.

8. The motor as claimed in claim 7, wherein the four engagement portions are annularly arranged to define an engagement hole, and wherein the engagement hole has a diameter larger than a diameter of the narrow portion and smaller than a diameter of the shaft.

9. The motor as claimed in claim 6, wherein the limiting member abuts the stator and the bearing.

* * * * *